United States Patent
Nobayashi et al.

(10) Patent No.: US 7,308,181 B2
(45) Date of Patent: Dec. 11, 2007

(54) METHOD FOR MANUFACTURING THREE-DIMENSIONAL PHOTONIC CRYSTAL

(75) Inventors: Kazuya Nobayashi, Edogawa-ku (JP); Akinari Takagi, Yokosuka (JP); Hikaru Hoshi, Yokohama (JP); Kiyokatsu Ikemoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/404,282

(22) Filed: Apr. 13, 2006

(65) Prior Publication Data

US 2006/0251372 A1    Nov. 9, 2006

(30) Foreign Application Priority Data

May 9, 2005   (JP) ............................. 2005-136282

(51) Int. Cl.
  G02B 6/10    (2006.01)
  G02B 6/00    (2006.01)

(52) U.S. Cl. ........................ 385/131; 385/147

(58) Field of Classification Search ................ 385/131, 385/147
See application file for complete search history.

(56) References Cited

U.S. PATENT DOCUMENTS

| | | | |
|---|---|---|---|
| 5,335,240 A | | 8/1994 | Ho et al. |
| 5,406,573 A | | 4/1995 | Ozbay et al. |
| 5,600,483 A | * | 2/1997 | Fan et al. .................... 359/245 |
| 5,998,298 A | | 12/1999 | Fleming et al. |
| 6,134,043 A | * | 10/2000 | Johnson et al. .............. 359/237 |
| 6,392,787 B1 | | 5/2002 | Cirelli et al. |
| 6,468,348 B1 | * | 10/2002 | Gruning et al. ................ 117/94 |
| 6,521,136 B1 | * | 2/2003 | Sfez et al. .................... 216/24 |
| 6,597,851 B2 | | 7/2003 | Johnson et al. |
| 6,690,876 B2 | * | 2/2004 | Sigalas ........................ 385/146 |
| 6,947,215 B2 | * | 9/2005 | Hoshi .......................... 359/576 |
| 6,993,235 B2 | * | 1/2006 | Takagi et al. ................ 385/129 |
| 7,085,467 B2 | * | 8/2006 | Ikemoto et al. .............. 385/129 |
| 7,209,622 B2 | * | 4/2007 | Hoshi et al. ................. 385/129 |
| 2001/0016247 A1 | * | 8/2001 | Matsuura et al. ............ 428/188 |
| 2003/0104700 A1 | * | 6/2003 | Fleming et al. ............. 438/694 |
| 2005/0150864 A1 | * | 7/2005 | Stasiak et al. ................ 216/41 |
| 2005/0207717 A1 | * | 9/2005 | Takagi et al. ................ 385/129 |
| 2006/0263025 A1 | * | 11/2006 | Sugita et al. ................ 385/129 |
| 2007/0031108 A1 | * | 2/2007 | Sugita et al. ................ 385/147 |

OTHER PUBLICATIONS

Eli Yablonovitch, Inhibited Spontaneous Emission in Solid-State Physics and Electronics, Physical Review Letters, vol. 58, 1987, pp. 2059-2062.

* cited by examiner

Primary Examiner—Michelle Connelly-Cushwa
Assistant Examiner—Rhonda S. Peace
(74) Attorney, Agent, or Firm—Canon U.S.A. Inc I.P. Div

(57) ABSTRACT

At least one exemplary embodiment is directed to a method for manufacturing a three-dimensional photonic crystal including a plurality of stacked layers having periodic structures where the thickness of the periodic structures in a layer are adjusted such that the layer satisfies the following equation:

$$neff1 \times H1 \times M = neff \times H$$

wherein H1 represents the actual thickness of the layer, neff1 represents the actual refractive index of the periodic refractive index structure, H represents the design thickness of the layer, neff represents the design effective refractive index of the periodic refractive index structure, and M represents a coefficient inclusive and between 0.5 and 2.0.

11 Claims, 17 Drawing Sheets

WOOD-PILE STRUCTURE (KNOWN)

METHOD FOR MANUFACTURING THREE-DIMENSIONAL PHOTONIC CRYSTAL

BACKGROUND OF THE INVENTION

1. Field of the Invention

The present invention relates to a method for manufacturing a three-dimensional photonic crystal, which can have a three-dimensional refractive-index periodic structure, and devices using the same.

2. Description of the Related Art

Yablonovitch et al. have introduced the idea of controlling the transmission and reflection of electromagnetic waves using fine structures having dimensions smaller than the wavelengths thereof (*Physical Review Letters*, Vol. 58, pp. 2059 (1987)). That is, the transmission and reflection of an electromagnetic wave can be controlled with an array of the fine structures. If the wavelength of the electromagnetic wave is as short as the wavelength of light, the transmission and reflection of light can be controlled with the fine structures. Materials having the fine structures are known as photonic crystals. A reflecting mirror that has a reflectivity of 100%, that is, no optical loss over a certain range of wavelengths can be probably prepared using a photonic crystal. Such a range of wavelengths is referred to as "photonic band gap" analogous to the energy gap of known semiconductors. A three-dimensional periodic fine structure has a photonic band gap in which light cannot propagate in any direction. Such a photonic band gap is hereinafter referred to as "complete photonic band gap". Structures with a complete photonic band gap can be used for various applications, for example, the control of the spontaneous emission of light-emitting devices. This leads to the possibility of novel functional devices.

There is an increasing demand for functional devices having structures with complete photonic band gaps over a wide wavelength range.

U.S. Pat. Nos. 6,392,787, 6,597,851, and 5,335,240 disclose structures with a photonic band gap.

In general, it can be difficult to prepare three-dimensional periodic structures with a small size. Hence, such three-dimensional periodic structures rarely operate at optical wavelengths less than several micrometers in a vacuum.

A layer-by-layer structure (hereinafter referred to as an LBL structure) can be prepared by stacking layers including refractive-index periodic structures. Some LBL structures have been prepared and evaluated. The evaluation has shown that the LBL structures have photonic band gaps. Typical examples of such an LBL structure include a structure discussed in U.S. Pat. No. 6,597,851 and a woodpile structure, shown in FIG. 9, discussed in U.S. Pat. No. 5,335,240.

FIG. 9 is an illustration of the woodpile structure. The woodpile structure represented by reference numeral 900 includes four layers: a first layer 901, a second layer 902, a third layer 903, and a fourth layer 904. The layers are arranged in the Z direction in FIG. 9 and form periodic units. The first to fourth layers 901 to 904 each include a plurality of rectangular rods 910, of which the width and height are represented by W and H, respectively, and which are arranged at an equal pitch represented by P. The rectangular rods 910 included in the first layer 901 extend in the Y direction and the rectangular rods 910 included in the second layer 902 extend in the X direction. The rectangular rods 910 included in the third layer 903 extend in the Y direction and are displaced from those of first layer 901 by P/2 in the X direction. The rectangular rods 910 included in the fourth layer 904 extend in the X direction and are displaced from those of the second layer 902 by P/2 in the Y direction. The woodpile structure has two periodic units. In the woodpile structure, all of the rectangular rods 910 contain a first medium and portions other than the rectangular rods 910 contain a second medium having a refractive index different from that of the rectangular rods 910. The pitch between the rectangular rods 910, the width and height of the rectangular rods 910, the refractive index of the first medium, and the refractive index of the second medium are determined such that the woodpile structure serves as a photonic crystal exhibiting a photonic band gap in a desired wavelength range. If the first medium has a refractive index of 3.309, the second medium has a refractive index of 1, and the rectangular rods 910 have a width of 0.30 P and a height of 0.30 P, the following result can be obtained by the calculation of the photonic band structure by a plane-wave expansion method: the woodpile structure has a complete photonic band gap at a normalized frequency (an angular frequency normalized with P) of 0.362 to 0.432. That is, if the pitch between the rectangular rods 910 is 600 nm, the woodpile structure has a complete photonic band gap at a wavelength of 1,389 to 1,657 nm.

Various methods for manufacturing woodpile structures are discussed in, for example, U.S. Pat. Nos. 5,406,573 and 5,998,298.

U.S. Pat. No. 5,406,573 discusses a method for manufacturing a woodpile structure by a wafer fusion technique. U.S. Pat. No. 5,998,298 discusses a method for manufacturing a woodpile structure by a procedure in which the formation, deposition, and polish of each refractive index periodic structure are repeated.

The method discussed in U.S. Pat. No. 5,406,573 will now be described with reference to FIGS. 10A to 10C. As illustrated in FIG. 10A, a transfer layer 1002, an etching stop layer 1003, and a transfer substrate 1004 are deposited on a substrate 1001, having a periodic refractive index pattern formed by an etching process, in that order and then fused to each other. As illustrated in FIG. 10B, the etching stop layer 1003 and the transfer substrate 1004 are etched off and the periodic refractive index pattern is transferred to the transfer layer 1002. The fusion of layers and substrates, the removal of substrates, and the formation of patterns are repeated, whereby a multilayer structure shown in FIG. 10C is prepared.

The method discussed in U.S. Pat. No. 5,998,298 will now be described with reference to FIGS. 11A to 11D. As illustrated in FIG. 11A, a thin-film layer 1102 is formed on a substrate 1101 by the vapor deposition of a first medium. As illustrated in FIG. 11B, the thin-film layer 1102 is etched so as to have a periodic refractive index pattern and a second medium 1103 is then deposited on the thin-film layer 1102 such that hollows in the periodic refractive index pattern can be filled with the second medium 1103. As illustrated in FIG. 11C, the second medium 1103 is polished. The formation of thin-film layers, the formation of periodic refractive index patterns, the deposition of media, and polishing are repeated, whereby a multilayer structure shown in FIG. 11D is prepared.

A periodic variation of the dielectric constant of a photonic crystal results in a photonic band gap. Therefore, in order to manufacture a photonic crystal with a photonic band gap at desired wavelengths, the three-dimensional periodicity of the photonic crystal can be controlled. In a method for manufacturing a three-dimensional photonic crystal by stacking layers each, which can have a periodic refractive index structure, the following items need to be controlled: the periodicity of the periodic refractive index structure, configurations of members included in the periodic refractive index structure, and the thickness of the layers. In a photonic crystal, which can have the woodpile structure shown in FIG. 9, if the actual width of rectangular rods included in this photonic crystal is 200 nm although the design width thereof is 180 nm, a wavelength range corresponding to a photonic band gap of this photonic crystal is shifted by about 60 nm from a design wavelength range. Alternatively, if the actual height of these rectangular rods is 200 nm although the design height thereof is 180 nm, this wavelength range is shifted by about 160 nm from the design wavelength range.

A periodic structure manufactured by a known method has a dimensional deviation that is equal to the sum of the thickness deviations of layers included in the periodic structure. Therefore, in order to control the deviation of the actual center wavelength of a photonic band gap (hereinafter referred to as a photonic band gap center wavelength) from the design center wavelength within, for example, 20 nm, the thickness deviation of each layer should be controlled within 2.5 nm.

In order to reduce the deviation of the actual photonic band gap center wavelength from the design photonic band gap center wavelength, an allowance of the thickness deviation of each layer should be controlled to be very small; hence, it can be very difficult to manufacture a three-dimensional photonic crystal operating at desired wavelengths. In the method for manufacturing the multilayer structure shown in FIG. 10, the sum of the following deviations should be controlled within a predetermined allowance: the thickness deviation of each transfer layer 1002, the thickness deviation of each substrate 1001, and the etching deviation of the transfer layer 1002. Hence, it can be difficult to manufacture this multilayer structure. In the method for manufacturing the multilayer structure shown in FIG. 11, the sum of the following deviations should be controlled within a predetermined allowance: the thickness deviation and polishing deviation of each thin-film layer 1102 and the thickness deviation of each substrate 1101. This method is low in yield and it can be difficult to manufacture this multilayer structure.

SUMMARY OF THE INVENTION

At least one exemplary embodiment is directed to the formation of three-dimensional photonic crystals with predetermined wavelength characteristics for use in functional devices (e.g., an optical waveguide, an optical resonator, an optical filter, and a polarizer).

At least one exemplary embodiment is directed to a method for manufacturing a three-dimensional photonic crystal exhibiting a photonic band gap in a desired range of wavelengths, the method being simple and high in reproducibility.

According to at least one exemplary embodiment, a method for manufacturing a three-dimensional photonic crystal including a plurality of stacked layers includes a step of controlling the thickness of the layers, a step of forming periodic refractive index structures in the layers, and a step of adjusting the thickness of each layer or dimensions of each periodic refractive index structure such that the layer satisfies the following equation:

$$neff1 \times H1 \times M = neff \times H$$

wherein H1 represents the actual thickness of the layer, neff1 represents the actual refractive index of the periodic refractive index structure, H represents the design thickness of the layer, neff represents the design effective refractive index of the periodic refractive index structure, and M represents a coefficient between 0.5 and 2.0.

A functional device according to at least one exemplary embodiment includes a three-dimensional photonic crystal manufactured by the above method. The three-dimensional photonic crystal can have a linear defect serving as a waveguide.

A functional device according to at least one exemplary embodiment includes a three-dimensional photonic crystal manufactured by the method. The three-dimensional photonic crystal can have a point defect serving as a resonator section.

A light-emitting device according to at least one exemplary embodiment includes the functional device having at least one resonator section and an exciting unit. The resonator section(s) can contain an active medium for emitting light and the exciting unit excites the active medium.

Further features of the present invention will become apparent from the following description of exemplary embodiments with reference to the attached drawings.

DESCRIPTION OF THE EMBODIMENTS

Figure 1A:
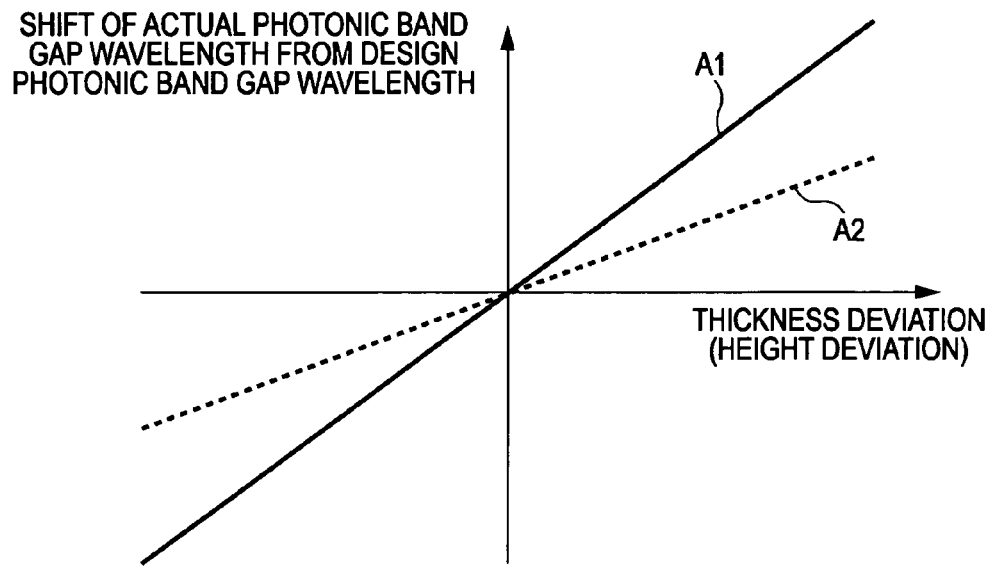
FIG. 1A is graph showing the relationships between the deviations of the actual thicknesses of stacked layers included in photonic crystals from the design thicknesses thereof and the shifts of the actual center wavelengths of photonic band gaps of photonic crystals from the design center wavelengths thereof.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the techniques of plasma and wet etching layers.

In all of the examples illustrated and discussed herein any specific values, for example the pitch and index of refraction values, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Exemplary embodiments will now be described.

Investigating the relationship between the dimensional deviation of structures arranged in photonic crystals and the transmission spectrum of the photonic crystals measured at wavelengths near photonic band gaps of the photonic crystals aids in the understanding of the sensitivity of manufacturing tolerances.

Figure 1B:
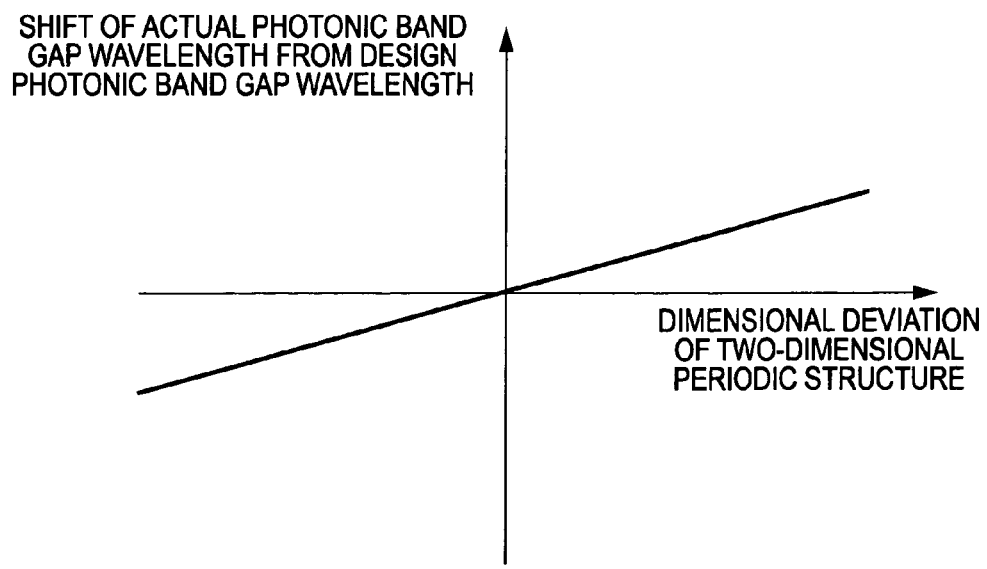
FIG. 1B is a graph showing the relationship between the deviations of actual dimensions of periodic refractive index structures included from design dimensions thereof and the shifts of the actual center wavelengths of photonic band gaps of photonic crystals from the design center wavelengths thereof.

For example, the shift of the center wavelength of the photonic band gap can be proportional to the thickness deviation of each layer with a periodic refractive index structure (the deviation of the actual layer thickness from the design layer thickness) and the dimensional deviation of the periodic refractive index structure as illustrated in FIGS. 1A and 1B.

The effective refractive index of the periodic refractive index structure in each layer can be expressed by the following equation:

$$neff = \sum_{k=1}^{N} \{ff(k) \times n(k)\} \quad (1)$$

where neff represents the effective refractive index of the periodic refractive index structure in each layer, N represents the number of fine structures that form the periodic refractive index structure of the layer, k represents a natural number between 1 and N, ff(k) represents the volume ratio of the kth fine structure, and n(k) represents the refractive index of the medium that constitute the kth fine structure.

FIG. 1A illustrates the relationships between the deviations of the actual thicknesses of stacked layers included in photonic crystals from the design thicknesses thereof and the shifts of the actual photonic band gap center wavelengths of the photonic crystals from the design photonic band gap center wavelengths thereof: the relationship shown by the solid line A1 has been determined in such a manner that light is applied to the photonic crystals in parallel to the stacking direction of the layers and the relationship shown by the dotted line A2 has been determined in such a manner that light is applied to the photonic crystals perpendicularly to the stacking direction of the layers. FIG. 1B illustrates the relationship between the dimensional deviations of periodic refractive index structures included in the layers and the shifts of the actual photonic band gap center wavelengths of the photonic crystals from the design photonic band gap center wavelengths thereof. The shifts are substantially equal to each other regardless of the direction of incident light.

Periodic refractive index structures included in these layers and the thickness of each layer are designed such that the following equation can be satisfied in each layer:

$$neff \times H = (neff + \Delta neff) \times (H + \Delta H) \times M \quad (2)$$

wherein neff represents the design effective refractive index of the periodic refractive index structure, H represents the design thickness of the layer, Δneff represents the deviation of the effective refractive index of the periodic refractive index structure from the design effective refractive index, ΔH represents the deviation of the thickness of the layer from the design thickness H, and M represents a coefficient that is between 0.5 and 2.0 and that determines the direction in which optical properties of this photonic crystal are maintained. This facilitates the maintenance of the optical properties in each direction even though the allowable deviation of the layer thickness and that of the effective refractive index are increased.

For example, if the layers for forming an LBL structure are prepared so as to have a predetermined thickness and a periodic refractive index structure, and are then formed in each layer by a related method as the method discussed in U.S. Pat. No. 5,406,573, dimensions of the periodic refractive index structure are adjusted depending on the thickness deviation of the layer such that Equation 2 can be satisfied.

In contrast, if periodic refractive index structures are formed in layers for forming an LBL structure and the thickness of each layer is then formed by a related method as the method discussed in U.S. Pat. No. 5,998,298, the layer thickness is adjusted depending on the deviation of the effective refractive index of each periodic refractive index structure such that Equation 2 can be satisfied.

With reference to FIG. 1A, the following ratio is substantially two to one: the ratio of a shift, shown by the solid line, in the photonic band gap center wavelength of each photonic crystal to which light is applied in parallel to the stacking direction of the layers to a shift, shown by the dotted line, in the photonic band gap center wavelength of the photonic crystal to which light is applied perpendicularly to the stacking direction of the layers. With reference to FIG. 1B, the following shift is substantially constant: a shift in the photonic band gap center wavelength of each photonic crystal with respect to the dimensional deviation of each periodic refractive index structure. Therefore, the photonic crystal maintains optical properties perpendicularly to the stacking direction of the layers when M is equal to 0.5 or 2.0. The photonic crystal maintains optical properties parallel to the stacking direction of the layers when M is equal to 1.0. The photonic crystal maintains optical properties along any direction when M is equal to 0.75 or 1.5.

Examples will now be described in detail with reference to the accompanying drawings.

EXAMPLE 1

Figure 2A:
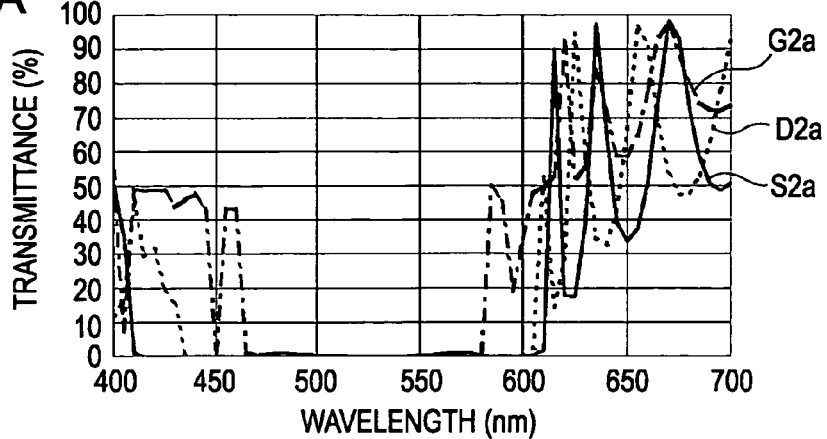
FIGS. 2A to 2H are graphs showing transmission spectra of a first to an eighth photonic crystal prepared in Example 1.
Figure 9:
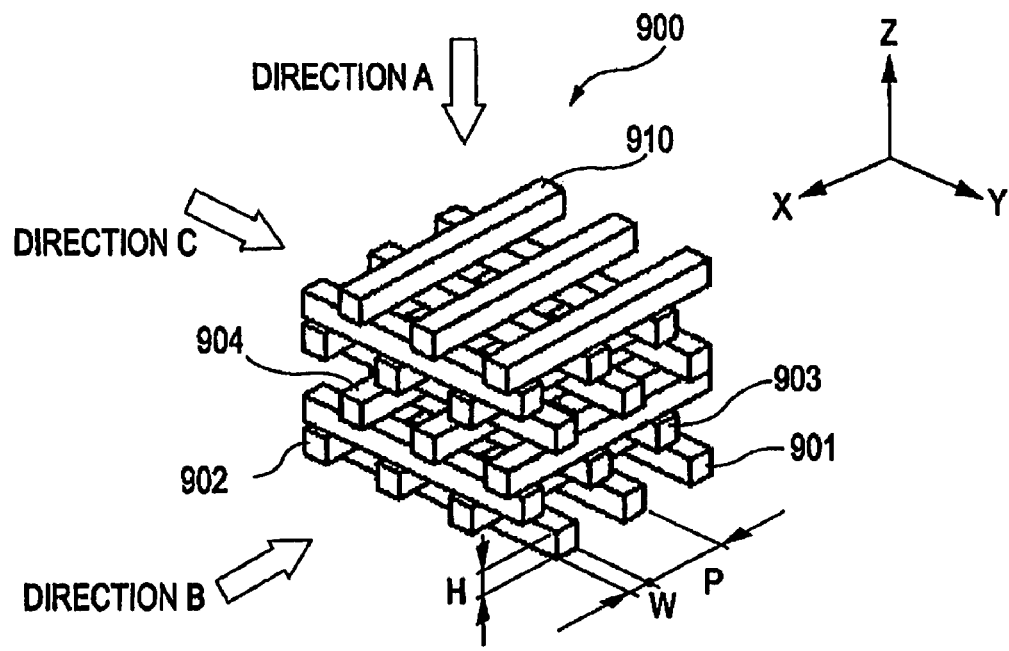
FIG. 9 is an illustration of a photonic crystal with a woodpile structure.
Figure 10A:
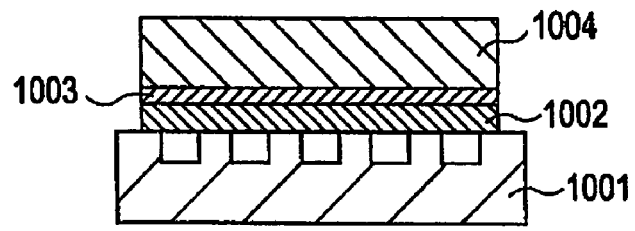
FIGS. 10A to 10C are illustrations showing steps of manufacturing a conventional photonic crystal.
Figure 10B:
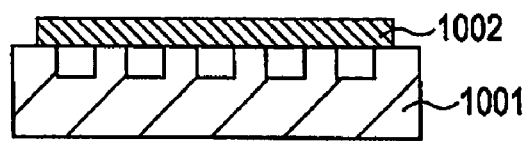
Figure 10C:
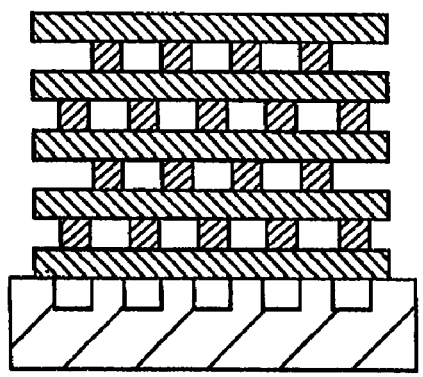
Figure 11A:
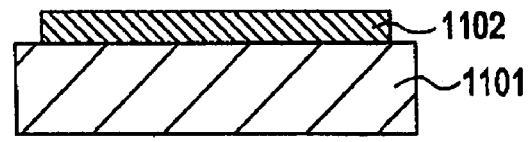
FIGS. 11A to 11D are illustrations showing steps of manufacturing a conventional photonic crystal.
Figure 11B:
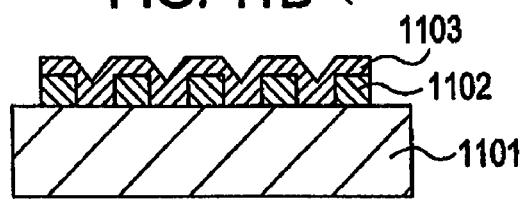
Figure 11C:
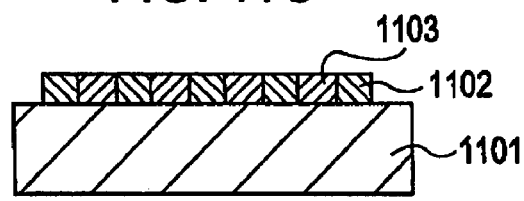
Figure 11D:
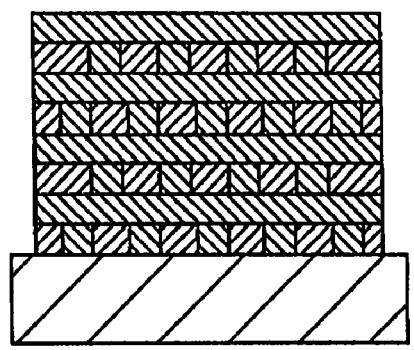

A first photonic crystal having a woodpile structure was prepared. The first photonic crystal included stacked layers including first rectangular rods, which can have a refractive index of about 3.309 and regions, other than the first rectangular rods, which can have a refractive index of about 1.0. The first rectangular rods were arranged at a pitch of 210 nm and have a width of 63 nm and a height of 63 nm. The first photonic crystal had six periodic units each including four of the layers. FIG. 2A shows transmission spectra of the first photonic crystal subjected to rigorous coupled-wave analysis (RCWA). In FIG. 2A, the solid line S2a shows a transmission spectrum of the first photonic crystal on which light is incident in the stacking direction (Direction A in FIG. 9) of the layers, the dotted line D2a shows a transmission spectrum of the first photonic crystal on which light is incident in the direction perpendicular to the stacking direction (Direction B in FIG. 9), and the dotted-chain line G2a shows a transmission spectrum of the first photonic crystal on which light is incident in the direction diagonal to the stacking direction (Direction C in FIG. 9).

As illustrated in FIG. 2A, the first photonic crystal has a complete photonic band gap between a wavelength of 465 nm and a wavelength of 580 nm because the first rectangular rods have dimensions equal to the design dimensions thereof. The first photonic crystal has a photonic band gap between a wavelength of 410 nm and a wavelength of 605 nm or between a wavelength of 465 nm and a wavelength of 580 nm when light is incident on the first photonic crystal in the stacking direction or in the direction perpendicular to the stacking direction, respectively.

In general, the following equation stands for a photonic crystal:

$$\lambda_0 = (\lambda_a + \lambda_b)/2 \qquad (3)$$

where $\lambda_0$ represents the center wavelength of a photonic band gap, $\lambda_a$ represents the lower end of a wavelength range corresponding to the photonic band gap, and $\lambda_b$ represents the upper end thereof.

Figure 2B:
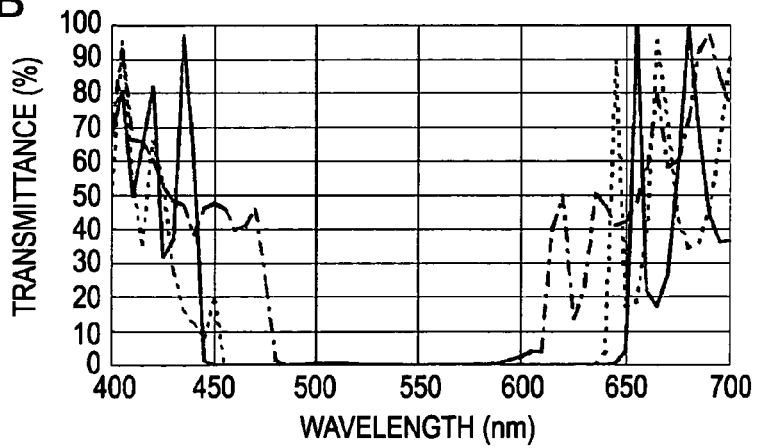

A second photonic crystal prepared is described and includes stacked layers including second rectangular rods having a height 6.3 nm greater than the design height thereof. FIG. 2B shows transmission spectra of the second photonic crystal. As illustrated in FIG. 2B, the second photonic crystal has a complete photonic band gap between a wavelength of 485 nm and a wavelength of 610 nm. Since the actual height of the second rectangular rods is 10% greater than the design height thereof, the center wavelength of the complete photonic band gap of the second photonic crystal is shifted by about 25 nm to longer wavelengths. This shift can be determined from the following equations:

$$(485+610)/2 = 547.5 \text{ (nm)} \qquad (4)$$

$$(465+580)/2 = 522.5 \text{ (nm)} \qquad (5)$$

$$547.5 - 522.5 = 25 \text{ (nm)} \qquad (6)$$

The second photonic crystal has a photonic band gap between a wavelength of 445 nm and a wavelength of 640 nm when light is incident on the second photonic crystal in the stacking direction of these layers. The second photonic crystal has a photonic band gap between a wavelength of 480 nm and a wavelength of 595 nm when light is incident on the second photonic crystal in the direction perpendicular to the stacking direction. Since the actual height of the second rectangular rods is 10% greater than the design height thereof, the center wavelength of the photonic band gap of the second photonic crystal on which light is incident in the stacking direction is shifted by about 35 nm to longer wavelengths and that of the second photonic crystal on which light is incident in the direction perpendicular to the stacking direction is shifted by about 15 nm to longer wavelengths.

Figure 2C:
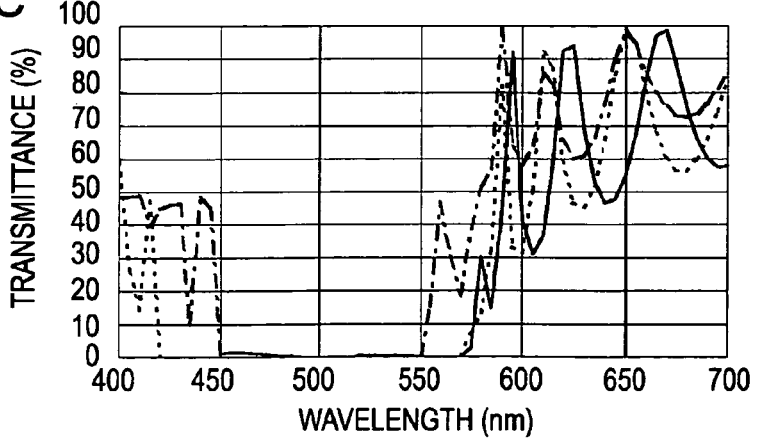

A third photonic crystal prepared is described and includes stacked layers including third rectangular rods having a height 6.3 nm less than the design height thereof. FIG. 2C shows transmission spectra of the third photonic crystal. As illustrated in FIG. 2C, the third photonic crystal has a complete photonic band gap between a wavelength of 450 nm and a wavelength of 550 nm. Since the actual height of the third rectangular rods is 10% less than the design height thereof, the center wavelength of the complete photonic band gap of the third photonic crystal is shifted by about 22.5 nm to shorter wavelengths. The third photonic crystal has a photonic band gap between a wavelength of 370 nm and a wavelength of 570 nm or between a wavelength of 450 nm and a wavelength of 550 nm when light is incident on the third photonic crystal in the stacking direction of these layers or in the direction perpendicular to the stacking direction, respectively. Since the actual height of the third rectangular rods is 10% less than the design height thereof, the center wavelength of the photonic band gap of the third photonic crystal on which light is incident in the stacking direction is shifted by about 37.5 nm to shorter wavelengths and that of the third photonic crystal on which light is incident in the direction perpendicular to the stacking direction is shifted by about 22.5 nm to shorter wavelengths.

Figure 2D:
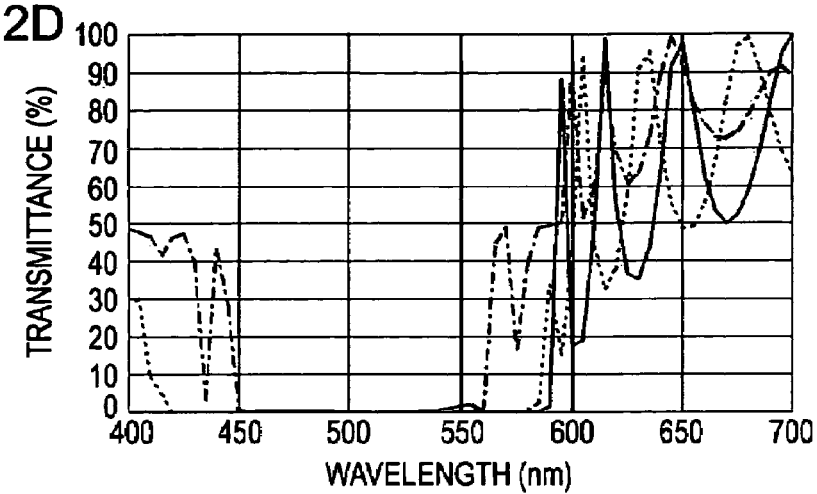

A fourth photonic crystal prepared is described and includes stacked layers including fourth rectangular rods having a width 6.3 nm less than the design width thereof. FIG. 2D shows transmission spectra of the fourth photonic crystal. As illustrated in FIG. 2D, the fourth photonic crystal has a complete photonic band gap between a wavelength of 450 nm and a wavelength of 560 nm. Since the actual width of the fourth rectangular rods is 10% less than the design width thereof, the center wavelength of the complete photonic band gap of the fourth photonic crystal is shifted by about 18 nm to shorter wavelengths.

Since the first to fourth photonic crystals were prepared by simply stacking the layers, the actual photonic band gap wavelengths of the second to fourth photonic crystals are shifted from the target photonic band gap wavelengths thereof. In order to control the shift of the center wavelength of a photonic band gap within 10 nm, rectangular rods included in a photonic crystal can be prepared such that the height deviation of each rectangular rod is controlled within 2.5% of the design height of the rectangular rod and the width deviation thereof is controlled within 5% of the design width thereof. In the first photonic crystal, 2.5% of the height of the first rectangular rods corresponds to 1.6 nm and 5% of the width thereof corresponds to 3.2 nm; hence, it can generally be difficult to manufacture photonic crystals with such high accuracy.

Figure 2E:
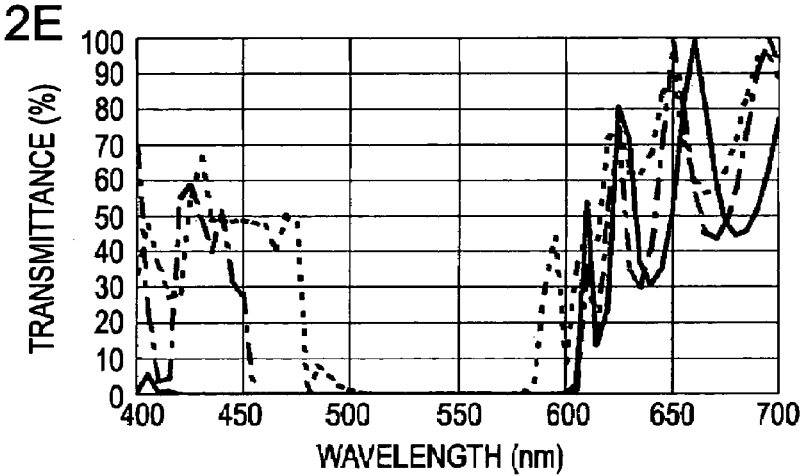
Figure 2F:
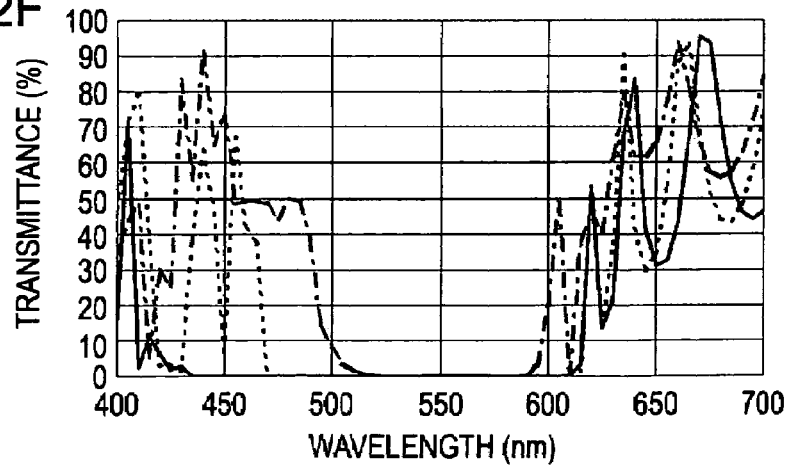
Figure 2G:
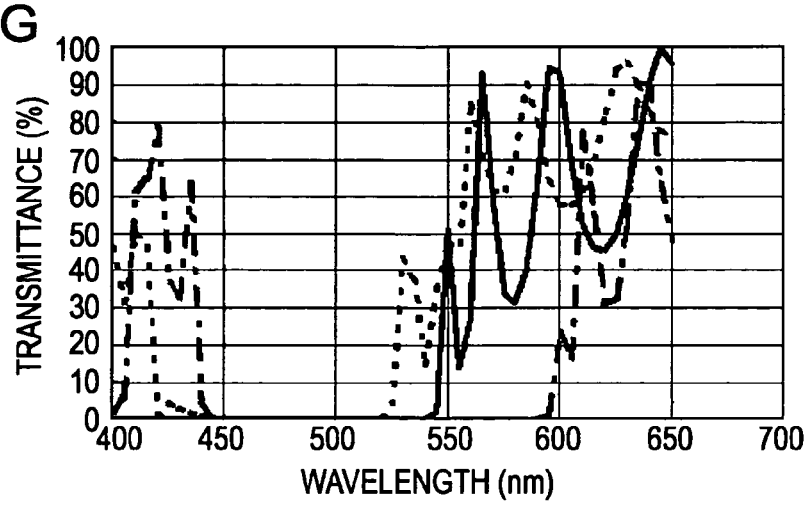
Figure 2H:
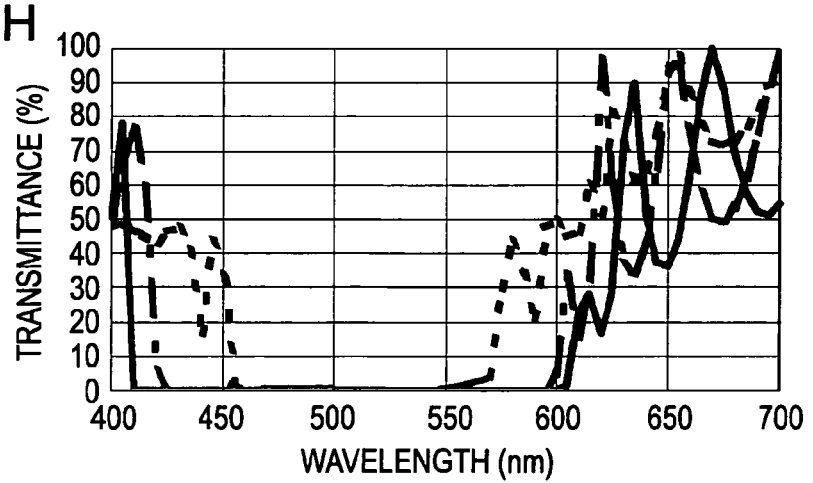

In contrast, photonic crystals, described below, having a woodpile structure were manufactured by a method according to at least one exemplary embodiment such that Equation 2 stands for layers included in the photonic crystals. FIG. 2E shows transmission spectra of a fifth photonic crystal including stacked layers including fifth rectangular rods having a height of 57 nm (6 nm less than the design height thereof) and a width of 76 nm (13 nm greater than the design width thereof). As illustrated in FIG. 2E, the fifth photonic crystal has a complete photonic band gap between a wavelength of 480 nm and a wavelength of 580 nm. That is, the center wavelength of the complete photonic band gap is shifted by only about 7.5 nm to longer wavelengths. The width of the fifth photonic crystal rectangular rods was determined such that Equation 2 can be satisfied when the actual height of the fifth photonic crystal rectangular rods is 6 nm less than the design height thereof and M is equal to 0.75. FIG. 2F shows transmission spectra of a sixth photonic crystal including stacked layers including sixth rectangular rods having a height of 57 nm (6 nm less than the design height thereof) and a width of 81 nm (18 nm greater than the design width thereof). As illustrated in FIG. 2F, the sixth photonic crystal has a photonic band gap between a wavelength of 410 nm and a wavelength of 610 nm when light is incident on the sixth photonic crystal in the stacking direction of these layers. That is, the center wavelength of this photonic band gap is shifted by only about 2.5 nm to longer wavelengths. The width of the sixth rectangular rods was determined such that Equation 2 is satisfied when the actual height of the sixth rectangular rods is 6 nm less than the design height thereof and M is equal to 1.0. FIG. 2G shows transmission spectra of a seventh photonic crystal including stacked layers including seventh rectangular rods having a height of 57 nm (6 nm less than the design height thereof) and a width of 72 nm (9 nm greater than the design width thereof). As illustrated in FIG. 2G, the seventh photonic crystal has a photonic band gap between a wavelength of 470 nm and a wavelength of 570 nm when light is incident on the seventh photonic crystal in the direction perpendicular to the stacking direction of these layers. That is, the center wavelength of this photonic band gap is shifted by only about 2.5 nm to shorter wavelengths. The width of the seventh rectangular rods was determined such that Equation 2 is satisfied when the actual height of the seventh rectangular rods is 6 nm less than the design height thereof and M is equal to 0.5. FIG. 2H shows transmission spectra of an eighth photonic crystal including stacked layers including eighth rectangular rods having a height of 63 nm and a width of 57 nm (6 nm less than the design width thereof). As illustrated in FIG. 2H, the eighth photonic crystal has a photonic band gap between a wavelength of 460 nm and a wavelength of 570 nm when light is incident on the sixth photonic crystal in the direction perpendicular to the stacking direction of these layers. That is, the center wavelength of this photonic band gap is shifted by only about 7.5 nm to shorter wavelengths. The height of the eighth rectangular rods was determined such that Equation 2 is satisfied when the width of the eighth rectangular rods is 6 nm less than the design width thereof and M is equal to 2.0.

The fifth to eighth photonic crystals have optical properties very close to those of the first photonic crystal although the height and width deviations of the fifth to eighth rectangular rods are greater than or equal to those of the second to fourth photonic crystals. This is because the fifth to eighth photonic crystals were manufactured by controlling the thicknesses of the layers of these photonic crystals and the effective refractive indexes of periodic refractive index structures included in the layers thereof such that Equation 2 is satisfied.

If a photonic crystal is manufactured in such a manner that the thicknesses of layers included in this photonic crystal and the effective refractive indexes of periodic refractive index structures included in these layers are controlled such that Equation 2 is satisfied when M is equal to 1.0, this photonic crystal has optical properties close to those of the first photonic crystal when light is incident on this photonic crystal in the stacking direction of these layers. Alternatively, if another a photonic crystal is manufactured in such a manner that the thicknesses of layers included in this photonic crystal and the effective refractive indexes of periodic refractive index structures included in these layers are controlled such that Equation 2 is satisfied when M is equal to 0.5 or 2.0, this photonic crystal has optical properties close to those of the first photonic crystal when light is incident on this photonic crystal in the direction perpendicular to the stacking direction of these layers.

EXAMPLE 2

The following crystals are described below: photonic crystals containing media having refractive indexes different from that of media contained in the photonic crystals described in Example 1.

Figure 3A:
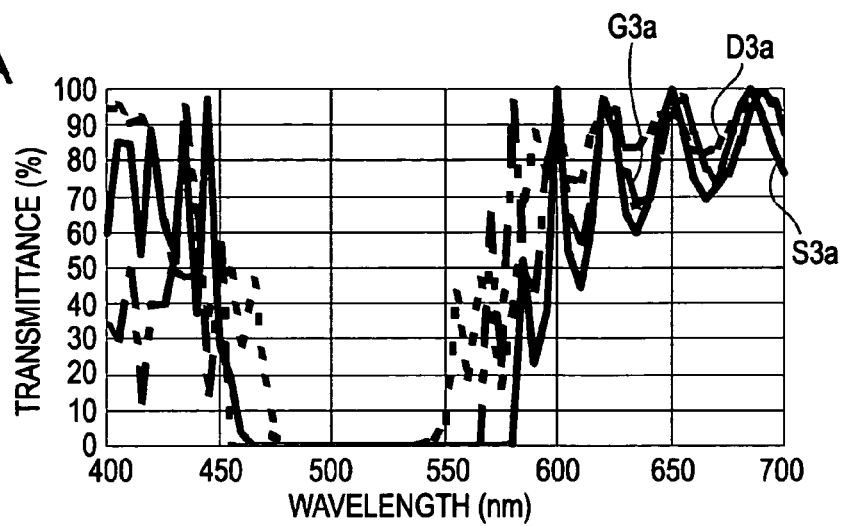
FIGS. 3A to 3C are graphs showing transmission spectra of a first to a third photonic crystal prepared in Example 2.

A first photonic crystal for the second example having a woodpile structure was prepared. The first photonic crystal of the second example included stacked layers including first rectangular rods having a refractive index of about 2.33 and regions, other than the first rectangular rods, which can have a refractive index of about 1.0. The first rectangular rods were arranged at a pitch of 240 nm and have a width of 84 nm and a height of 84 nm. The first photonic crystal of the second example had ten periodic units each including four of the layers. FIG. 3A shows transmission spectra of the first photonic crystal of the second example subjected to RCWA. In FIG. 3A as well as FIG. 2A, the solid line S3$a$ shows a transmission spectrum of the first photonic crystal of the second example on which light is incident in the stacking direction of the layers, the dotted line D3$a$ shows a transmission spectrum of the first photonic crystal of the second example on which light is incident in the direction perpendicular to the stacking direction, and the dotted-chain line G3$a$ shows a transmission spectrum of the first photonic crystal of the second example on which light is incident in the direction diagonal to the stacking direction. As illustrated in FIG. 3A, the first photonic crystal of the second example has a complete photonic band gap between a wavelength of 465 nm and a wavelength of 580 nm because the actual height and width of the first rectangular rods are the same as the design height and width thereof.

Figure 3B:
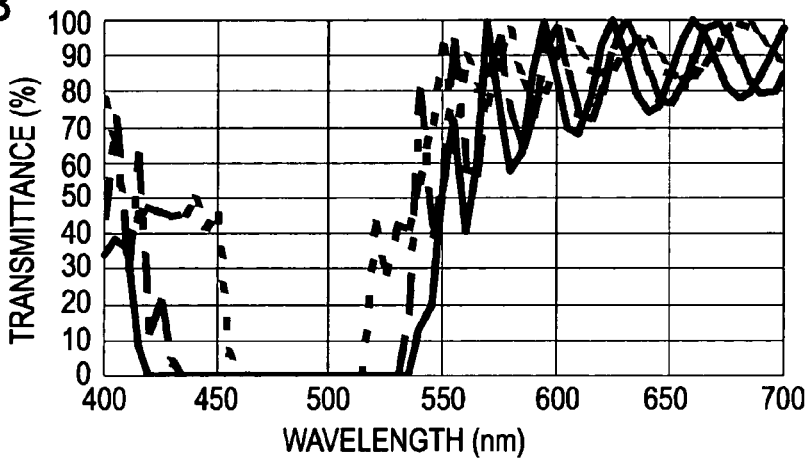

A second photonic crystal of the second example prepared as a comparative example, includes stacked layers including second rectangular rods having a height 8.4 nm less than the design height thereof. FIG. 3B shows transmission spectra of the second photonic crystal of the second example. As illustrated in FIG. 3B, the second photonic crystal of the second example has a complete photonic band gap between a wavelength of 460 nm and a wavelength of 510 nm. Since the actual height of the second rectangular rods is 10% less than the design height thereof, the center wavelength of this complete photonic band gap is shifted by about 22.5 nm to shorter wavelengths.

Figure 3C:
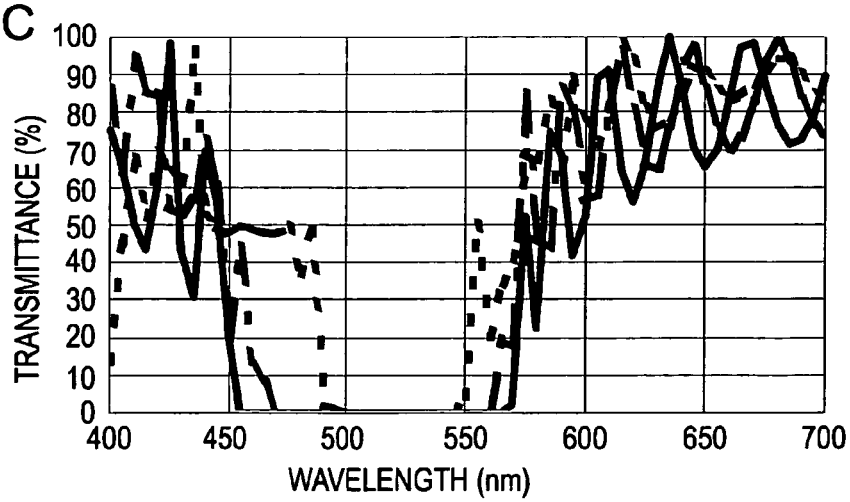

A third photonic crystal of the second example was prepared in accordance with at least one exemplary embodiment, and includes stacked layers including third rectangular rods having a height of 76 nm (8 nm less than the design height thereof) and a width of 105 nm (21 nm greater than the design width thereof). FIG. 3C shows transmission spectra of the third photonic crystal of the second example. As illustrated in FIG. 3C, the third photonic crystal of the second example has a complete photonic band gap between a wavelength of 490 nm and a wavelength of 545 nm. The center wavelength of this complete photonic band gap is shifted by about 7.5 nm to longer wavelengths. The width of the third rectangular rods was determined such that Equation 2 is satisfied when the actual height of the third rectangular rods is 8 nm less than the design height thereof and M is equal to 0.75. The third photonic crystal of the second example has optical properties close to those of the first photonic crystal although the width deviation of the third rectangular rods is greater than that of the second rectangular rods. This is because the third photonic crystal of the second example was manufactured by controlling the thicknesses of the layers of the third photonic crystal and the effective refractive indexes of periodic refractive index structures included in the layers thereof such that Equation 2 is satisfied. Thus, photonic crystals formed by at least one of the exemplary embodiments are generally independent of the refractive indexes of the medium.

EXAMPLE 3

Figure 4A:
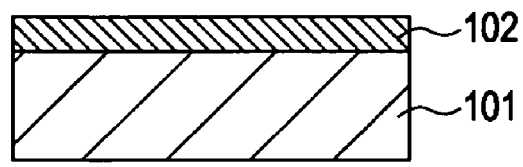
FIGS. 4A to 4H are illustrations showing steps of manufacturing a photonic crystal.
Figure 4B:
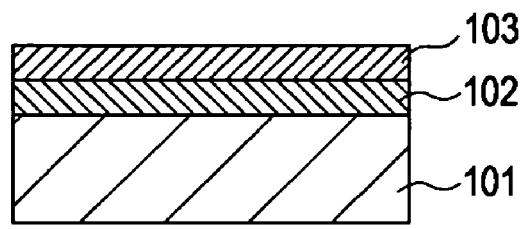
Figure 4C:
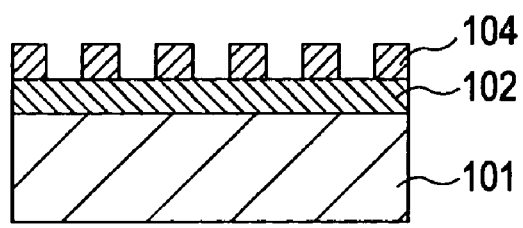
Figure 4D:
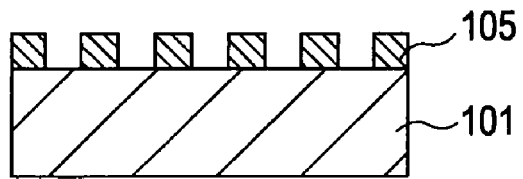

A method for manufacturing a photonic crystal according to at least one exemplary embodiment will now be described in detail. As illustrated in FIG. 4A, a thin film 102 is formed on a first substrate 101 by a crystal growth process or a vapor deposition process using a medium 1 and then measured for thickness with a scanning probe microscope or a contact profilometer. As illustrated in FIG. 4B, the thin film 102 is coated with a resist 103. As illustrated in FIG. 4C, the resist 103 is processed into a periodic resist pattern 104 depending on the thickness of the thin film 102 (e.g., by electron beam lithography) such that the periodic resist pattern 104 satisfies Equation 2. As illustrated in FIG. 4D, the thin film 102 is etched using the periodic resist pattern 104 as a mask and the periodic resist pattern 104 is then removed, whereby a first periodic refractive index structure 105 containing the medium 1 in medium 2 is formed on the first substrate 101.

Figure 4E:
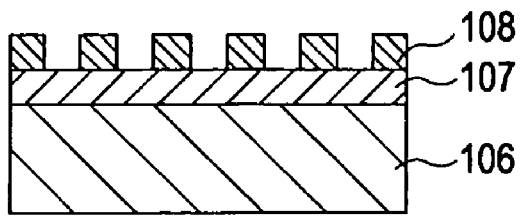
Figure 4F:
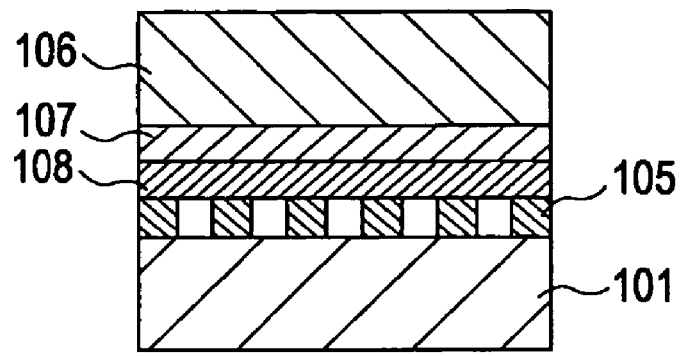
Figure 4G:
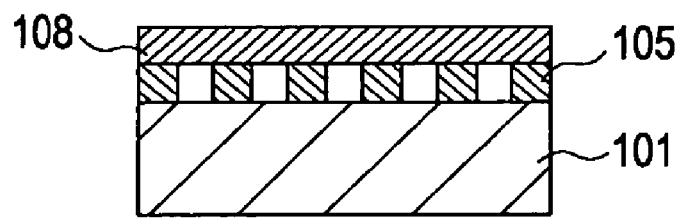

As illustrated in FIG. 4E, a second periodic refractive index structure 108 is formed on an etching stop layer 107 disposed on a second substrate 106 using the medium 1 in the same manner as the above. As illustrated in FIG. 4F, the first and second periodic refractive index structures 105 and 108) are aligned with each other, joined to each other, and then fused. As illustrated in FIG. 4G, the etching stop layer 107 and the second substrate 106 are removed by a lift-off process or an etching process, whereby a double-layer structure is prepared.

Figure 4H:
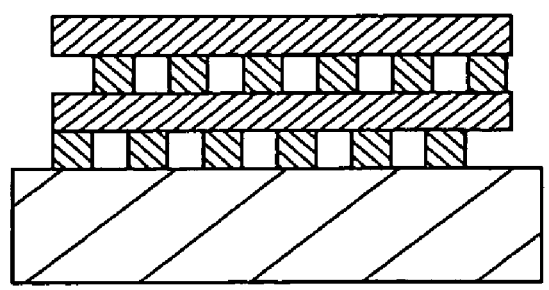

The above procedure is repeated, whereby a photonic crystal, shown in FIG. 4H, including a plurality of layers can be manufactured.

The first and second periodic refractive index structures 105 and 108 and other periodic refractive index structures can be formed by an etching process in combination with other processes, for example: an interference exposure process, a nanoimprinting process, or a multiphoton absorption process using a ultra-short pulsed beam; a process using a lithographic technique, an X-ray exposure technique, an ultraviolet ray exposure technique, or a nearfield exposure technique; or another process as known by one of ordinary skill in the relevant arts.

The first and second periodic refractive index structures 105 and 108 and other periodic refractive index structures can be stacked by, for example, the wafer fusion technique discussed in U.S. Pat. No. 5,406,573.

Examples of the medium 1 include compound semiconductors such as GaAs, InP, GaN, and ZnO; semiconductors such as Si; dielectric compounds such as $TiO_2$; and metals. Examples of a low-refractive index medium (a medium 2) include dielectric compounds such as $SiO_2$, organic polymers such as PMMA, and air.

EXAMPLE 4

Figure 12A:
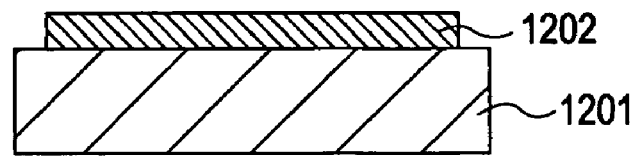
FIGS. 12A to 12G are illustrations showing steps of manufacturing a photonic crystal according to at least one exemplary embodiment.
Figure 12B:
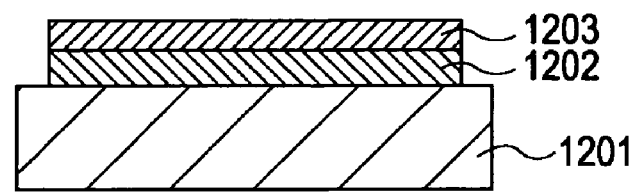
Figure 12C:
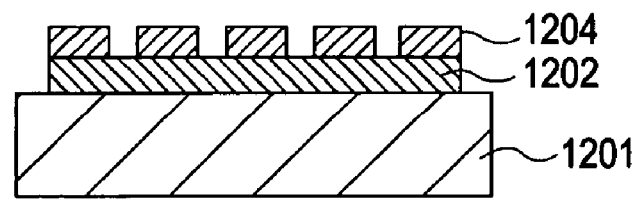
Figure 12D:
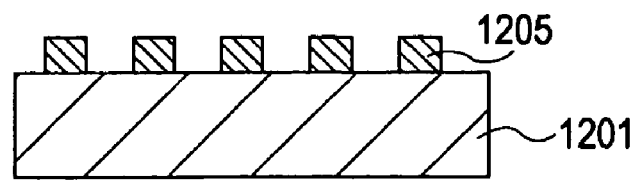

Another method for manufacturing a photonic crystal according to at least one exemplary embodiment will now be described. As illustrated in FIG. 12A, a thin film 1202 is formed on a substrate 1201 by a crystal growth process or a vapor deposition process using a first medium 1. As illustrated in FIG. 12B, the thin film 1202 is coated with a resist 1203. As illustrated in FIG. 12C, the resist 1203 is processed into a periodic resist pattern 1204 (e.g., by electron beam lithography). As illustrated in FIG. 12D, the thin film 1202 is etched using the periodic resist pattern 1204 as a mask and the periodic resist pattern 1204 is then removed, whereby a periodic refractive index structure 1205 is formed. The periodic refractive index structure 1205 is measured for dimension (e.g., with a scanning probe microscope or a contact profilometer).

Figure 12E:
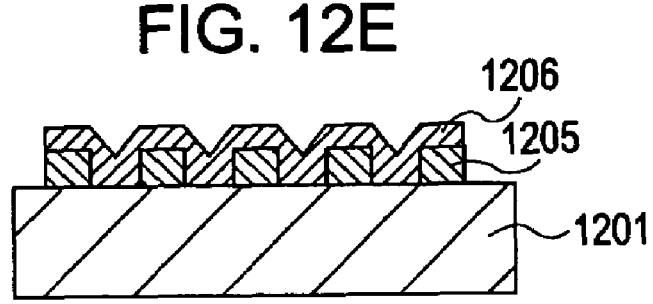
Figure 12F:
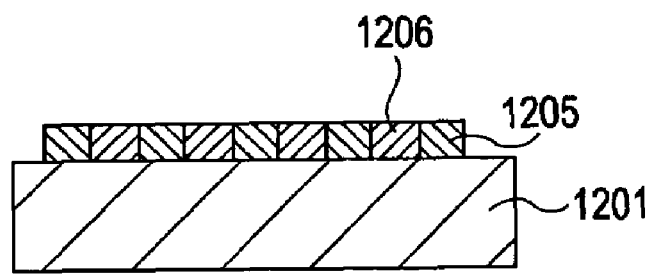
Figure 12G:
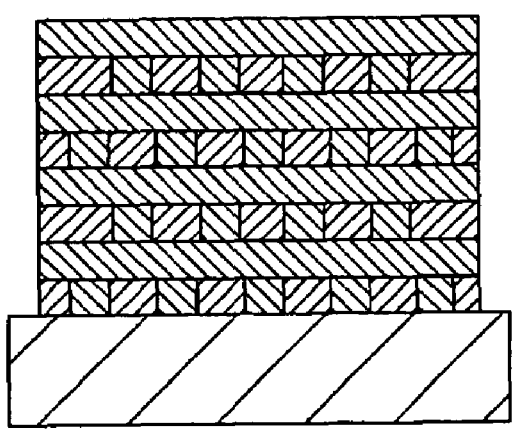

As illustrated in FIG. 12E, hollows in the periodic refractive index structure 1205 can be filled with a second medium (medium 2) 1206. As illustrated in FIG. 12F, the periodic refractive index structure 1205 is reduced in thickness by etching, chemical mechanical polishing (CMP), gas cluster ion beam (GCIB) processing, or abrasion such that Equation 2 can be satisfied. The above procedure is repeated, whereby a photonic crystal, shown in FIG. 12G, including a plurality of layers is manufactured. The periodic refractive index structures 1205 and other periodic refractive index structures can be formed by an etching process in combination with a process, for example: an interference exposure process, a nanoimprinting process, a multiphoton absorption process using a ultra-short pulsed beam; a process using a lithographic technique, an X-ray exposure technique, an ultraviolet ray exposure technique, or a nearfield exposure technique; or another process as known by one of ordinary skill in the relevant arts. Alternatively, the periodic refractive index structures 1205 and other periodic refractive index structures can be formed by selective growth using a mask pattern.

The periodic refractive index structures 1205 and other periodic refractive index structures can be stacked by, for example, a technique in which deposition and polishing are repeated as discussed in U.S. Pat. No. 5,998,298.

Examples of the first medium 1 include compound semiconductors such as GaAs, InP, GaN, and ZnO; semiconductors such as Si; dielectric compounds such as $TiO_2$; and metals. Examples of the second medium 1206 include dielectric compounds such as $SiO_2$, organic polymers such as PMMA, and air.

EXAMPLE 5

Figure 13A:
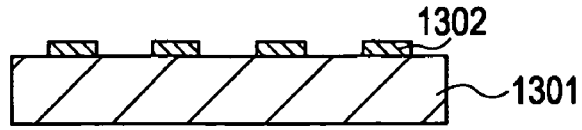
FIGS. 13A to 13I are illustrations showing steps of manufacturing a photonic crystal according to an exemplary embodiment of the present invention.
Figure 13B:
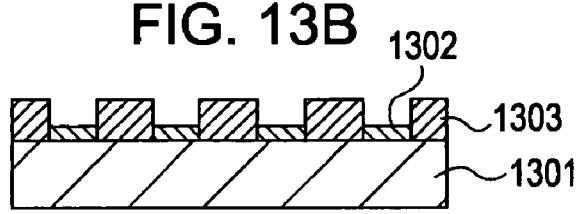
Figure 13C:
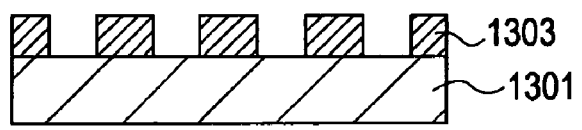

Another method for manufacturing a photonic crystal according to at least one exemplary embodiment will now be described. As illustrated in FIG. 13A, a periodic first mask pattern 1302 is formed on a first substrate 1301 (e.g., by electron beam lithography). The first mask pattern 1302 is measured for dimension (e.g., with a scanning probe microscope or a contact profilometer). As illustrated in FIG. 13B, a first periodic refractive index structure 1303 is formed by selective growth using a medium 1 and the first mask pattern 1302 as a mask such that the a first periodic refractive index structure 1303 has such a height that satisfies Equation 2. Alternatively, the first periodic refractive index structure 1303 can be formed so as to have a height greater than a height that satisfies Equation 2 and then reduced in height by etching, CMP, GCIB processing, or abrasion such that Equation 2 is satisfied. As illustrated in FIG. 13C, the first mask pattern 1302 is removed.

Figure 13D:
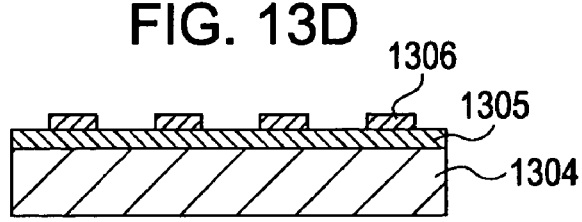
Figure 13E:
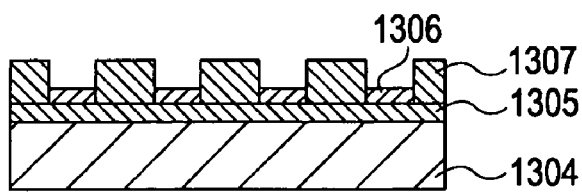
Figure 13F:
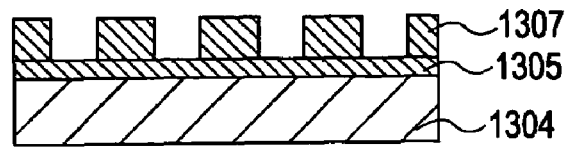

As illustrated in FIG. 13D, a periodic second mask pattern 1306 is formed on an etching stop layer 1305 disposed on a second substrate 1304. The second mask pattern 1306 is measured for dimension in the same manner as the above for the first mask pattern 1302. As illustrated in FIG. 13E, a periodic second refractive index structure 1307 is formed by selective growth using the medium 1 and the second mask pattern 1306 as a mask. The second refractive index structure 1307 can be formed so as to have a height greater than such a height that satisfies Equation 2 and then reduced in height by etching, CMP, GCIB processing, or abrasion such that Equation 2 is satisfied. As illustrated in FIG. 13F, the second mask pattern 1306 is removed.

Figure 13G:
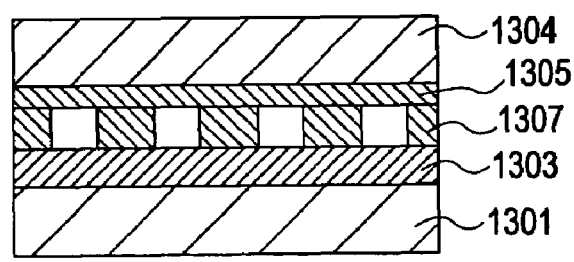
Figure 13H:
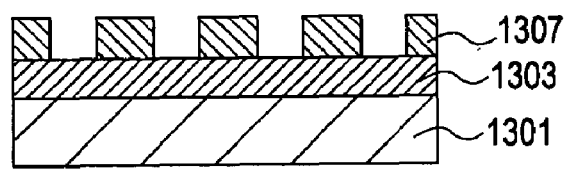

As illustrated in FIG. 13G, the first and second refractive index structures 1303 and 1307 are aligned with each other, joined to each other, and then fused. The etching stop layer 1305 and the second substrate 1304 are removed by a lift-off process or an etching process, whereby a multilayer structure is prepared.

Figure 13I:
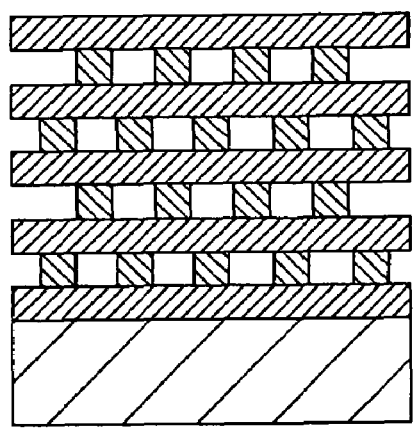

The above procedure is repeated, whereby a photonic crystal, shown in FIG. 13I, including a plurality of layers is manufactured.

Other refractive index structures can be formed so as to have such a height that satisfies Equation 2 in such a manner that thin-films are formed on substrates having mask patterns thereon by vapor deposition and the thin-films and the mask patterns are lifted off.

The first and second refractive index structures 1303 and 1307 and other periodic refractive index structures can be stacked by, for example, the wafer fusion technique discussed in U.S. Pat. No. 5,406,573.

Examples of the medium 1 include compound semiconductors such as GaAs, InP, GaN, and ZnO; semiconductors such as Si; dielectric compounds such as TiO$_2$; and metals. Examples of a low-refractive index medium include dielectric compounds such as SiO$_2$, organic polymers such as PMMA, and air.

EXAMPLE 6

Figure 5A:
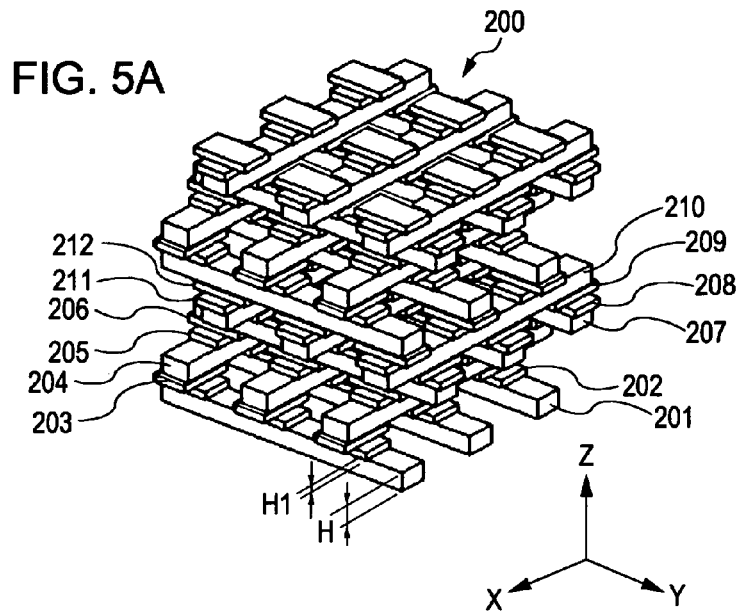
FIG. 5A is a perspective view of a principal part of a photonic crystal with an LBL structure.
Figure 5B:
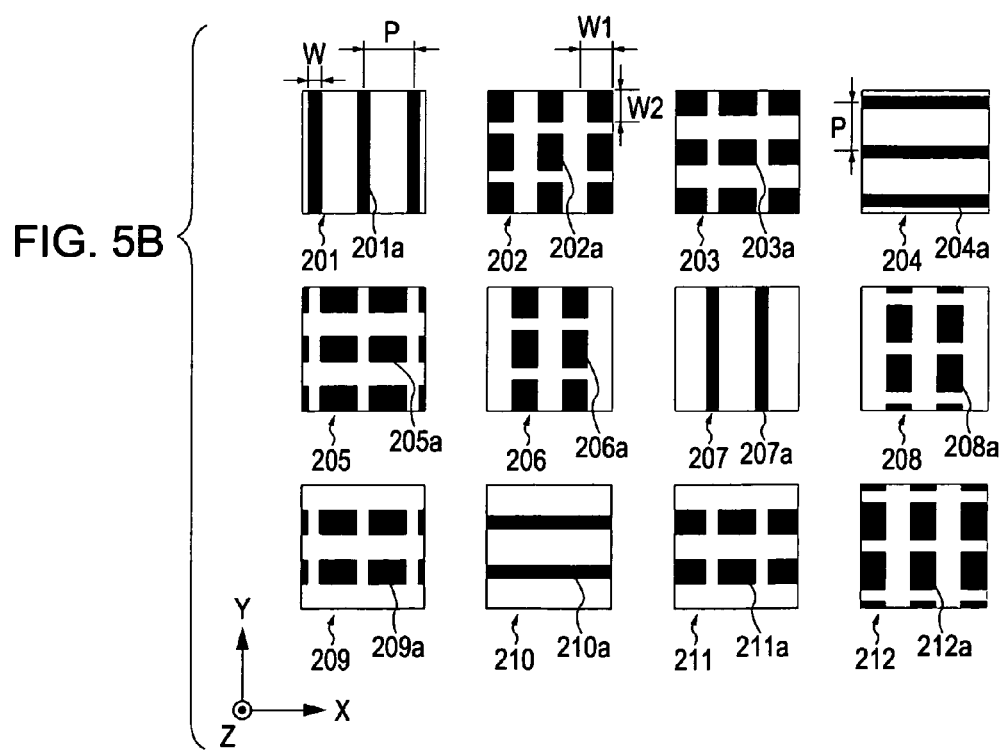
FIG. 5B includes sectional views of first to twelfth layers included in the photonic crystal shown in FIG. 5A.

FIG. 5A is a perspective view of a principal part of a first photonic crystal 200 with an LBL structure, which is different from a woodpile structure. The LBL structure has a photonic band gap wider than that of the woodpile structure. The first photonic crystal 200 includes first to twelfth layers 201 to 212 which are periodic units, which are parallel to the X-Y plane in FIG. 5A, and which can be arranged in that order. FIG. 5B includes sectional views of the first to twelfth layers 201 to 212 taken in parallel to the X-Y plane. The first and seventh layers 201 to 207 include a plurality of first rectangular rods 201a and seventh rectangular rods 207a, respectively. The first and seventh rectangular rods 201a and 207a contain a first medium 1, extend in the Y direction, and can be arranged in the X direction at an equal pitch represented by P. The first rectangular rods 201a are each displaced from the corresponding seventh rectangular rods 207a by P/2 in the X direction. The fourth and tenth layers 204 to 210 include a plurality of fourth rectangular rods 204a and tenth rectangular rods 210a, respectively. The fourth and tenth rectangular rods 204a and 210a contain the first medium 1, extend in the X direction, and can be arranged in the Y direction at an equal pitch represented by P. The fourth rectangular rods 204a are each displaced from the corresponding tenth rectangular rods 210a by P/2 in the Y direction.

The second layer (additional layer) 202 and the third layer 203 include second rectangular blocks 202a and third rectangular blocks 203a, respectively. The second and third rectangular blocks 202a and 203a are located at positions corresponding to intersections of the first and fourth rectangular rods 201a and 204a when viewed in the Z direction, are spaced from each other, can be arranged in parallel to the X-Y plane, and contain the first medium 1. The second rectangular blocks 202a can be symmetric to the third rectangular blocks 203a and are rotated 90 degrees therefrom.

The fifth, sixth, eighth, ninth, eleventh, and twelfth layers 205, 206, 208, 209, 211, and 212 (referred to as additional layers) as well as the second and third layers 202 and 203 include fifth rectangular blocks 205a, sixth rectangular blocks 206a, eighth rectangular blocks 208a, ninth rectangular blocks 209a, eleventh rectangular blocks 211a, and twelfth rectangular blocks 212a, respectively. The fifth, sixth, eighth, ninth, eleventh, and twelfth rectangular blocks 205a, 206a, 208a, 209a, 211a, and 212a are located at positions corresponding to intersections of the fourth, seventh, and tenth rectangular rods 204a, 207a, and 210a when viewed in the Z direction, are spaced from each other, can be arranged in parallel to the X-Y plane, and contain the first medium 1.

The above rods and blocks arranged in that order are in contact with one another. In the first to twelfth layers 201 to 212, regions other than the rods and blocks can be filled with a second medium 2. The following properties and dimensions can be determined such that the photonic crystal exhibits a photonic band gap in a desired wavelength range: the refractive indexes of the first and second media 1 and 2, dimensions of the rods and blocks, the pitches between the rods and blocks, and the thicknesses of the first to twelfth layers 201 to 212.

Figure 6A:
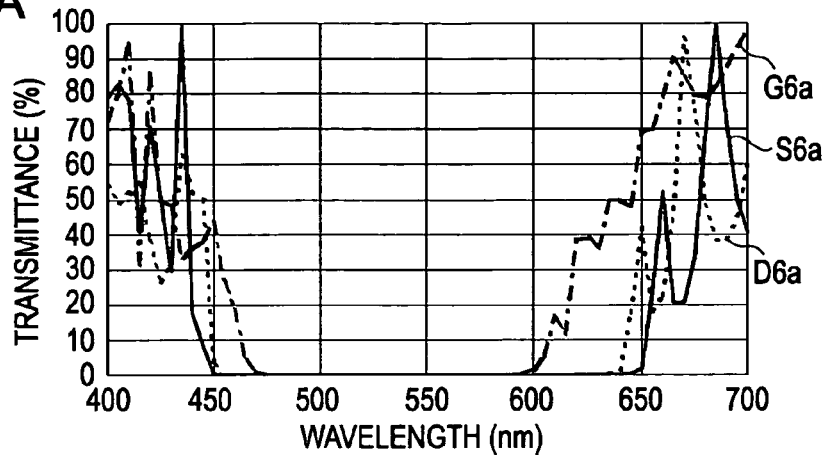
FIGS. 6A to 6C are graphs showing transmission spectra of a first to a third photonic crystal prepared in Example 6.

The rods and the blocks have a refractive index of 3.309 and the regions other than the rods and the blocks have a refractive index of 1.0. The rods can have a width of 63 nm and a height of 52 nm and the pitch between the rods is 208 nm. The blocks have a length of 125 nm, a width of 83 nm, and a height of 10 nm. The first photonic crystal 200 has six periodic units. FIG. 6A shows transmission spectra of the first photonic crystal 200 subjected to RCWA. In FIG. 6A as well as FIG. 2A, the solid line S6a shows a transmission spectrum of the first photonic crystal 200 on which light is incident in the stacking direction of the first to twelfth layers 201 to 212, the dotted line D6a shows a transmission spectrum of the first photonic crystal 200 on which light is incident in the direction perpendicular to the stacking direction thereof, and the dotted-chain line G6a shows a transmission spectrum of the first photonic crystal 200 on which light is incident in the direction diagonal to the stacking direction thereof. The first photonic crystal 200 has a complete photonic band gap between a wavelength of 470 nm and a wavelength of 600 nm, since the actual dimensions of these rods and blocks are the same as the design dimensions thereof.

Figure 6B:
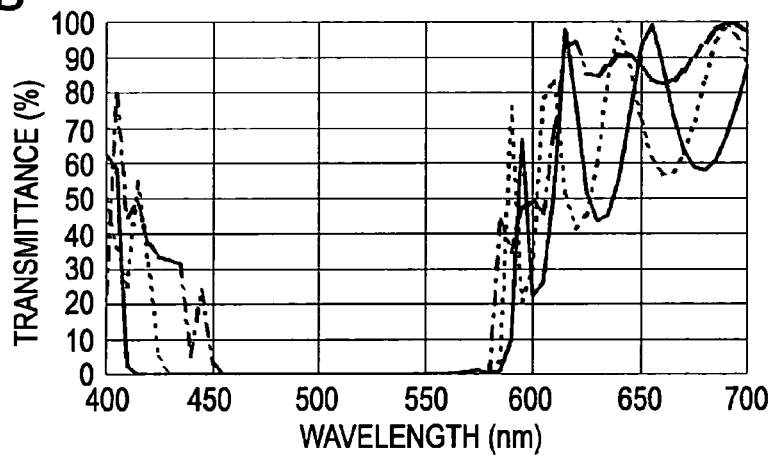

FIG. 6B shows transmission spectra of a second photonic crystal of the form illustrated in FIG. 5A, which includes second rectangular rods having a height 5.2 nm less than the design height thereof and which includes second rectangular blocks having a height 1 nm less than the design height thereof. The second photonic crystal has a complete photonic band gap between a wavelength of 450 nm and a wavelength of 580 nm. Since the actual heights of the second rectangular rods and the second rectangular blocks are 10% less than the design heights thereof, the center wavelength of this complete photonic band gap is shifted by about 20 nm to shorter wavelengths as compared to that of the first photonic crystal 200.

Figure 6C:
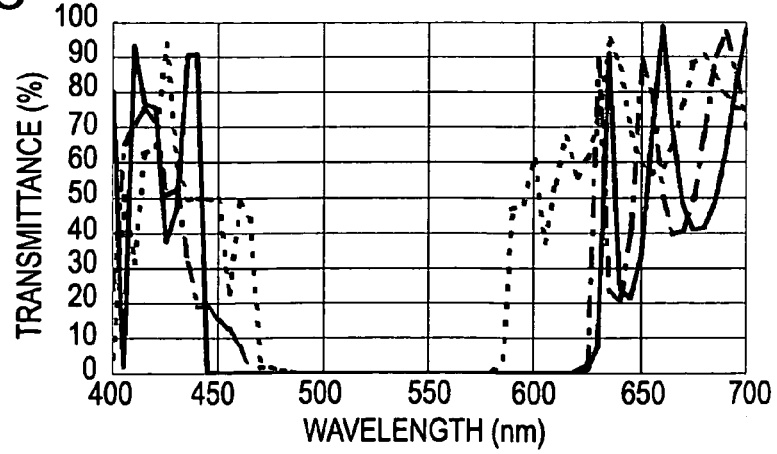

FIG. 6C shows transmission spectra of a third photonic crystal of the form illustrated in FIG. 5A, which includes third rectangular rods having a height of 46.8 nm (5.2 nm less than the design height thereof) and a width of 75 nm (12 nm greater than the design width thereof) and which includes third rectangular blocks having a length of 133 nm (8 nm greater than the design length thereof), a width of 96 nm (13 nm greater than the design width thereof), and a height of 9 nm (1 nm less than the design height thereof). The third photonic crystal has a complete photonic band gap between a wavelength of 470 nm and a wavelength of 580 nm. The center wavelength of this complete photonic band gap is shifted by about 10 nm to shorter wavelengths. The width of the third rectangular rods and the length and width of the third rectangular blocks have been determined such that Equation 2 is satisfied when the actual height of the third rectangular rods is 12 nm less than the design height thereof, the actual height of the third rectangular blocks is 1 nm less than the design height thereof, and M is equal to 0.75.

The third photonic crystal of the form illustrated in FIG. 5A, has optical properties more close to those of the first photonic crystal of the form illustrated in FIG. 5A, as compared to the second photonic crystal of the form illustrated in FIG. 5A, although the rod height, rod width, block length, and block width of the third photonic crystal seriously deviate from those of the first photonic crystal 200. This is because the third photonic crystal was manufactured in such a manner that the rod heights and block heights of the third photonic crystal and the effective refractive index of periodic refractive index structures included in the third photonic crystal are adjusted such that Equation 2 is satisfied. Therefore, photonic crystals with an LBL structure can be readily manufactured.

EXAMPLE 7

Figure 7A:
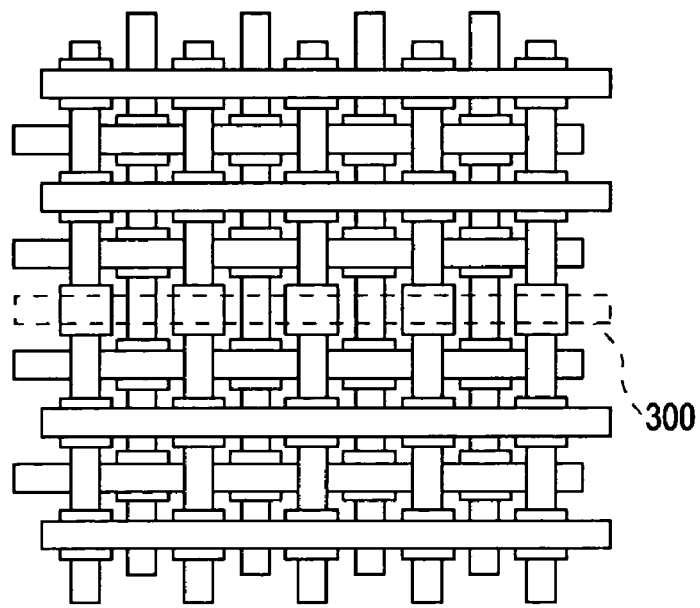
FIGS. 7A and 7B are sectional views of functional devices including photonic crystals manufactured by a method according to at least one exemplary embodiment.
Figure 7B:
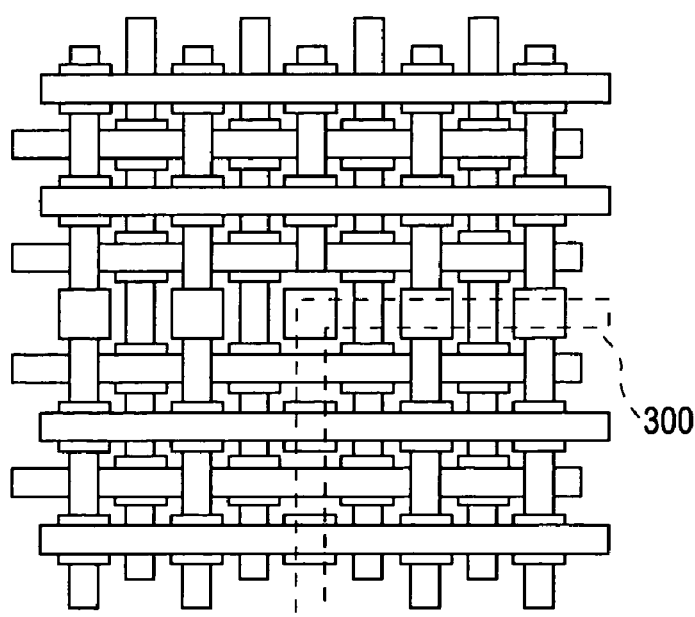

Examples of a functional device including a photonic crystal manufactured by a manufacturing method according to at least one exemplary embodiment will now be described. FIGS. 7A and 7B are sectional views of functional devices which include photonic crystals manufactured by the method and which have waveguide sections 300 that are linear defects extending through the photonic crystals. Electromagnetic waves with wavelengths corresponding to photonic band gaps of the photonic crystals are allowed to propagate through the waveguide sections 300. Therefore, the waveguide sections 300 have low loss and can be angled at a sharp angle. In the functional device shown in FIG. 7A, the waveguide section 300 is formed by removing a linear region of one of the photonic crystals. In the functional device shown in FIG. 7B, the waveguide section 300 is formed by removing a bent region of the other one. The linear defects are formed by removing portions of the photonic crystals, displacing portions thereof, varying dimensions of portions thereof, or replacing portions thereof with a medium, which can have a refractive index different from the refractive indexes of these portions, such that guided electromagnetic waves have desired wavelengths. Waveguides operating at desired wavelengths can be readily manufactured using photonic crystals manufactured by methods in accordance with exemplary embodiments discussed.

Figure 8:
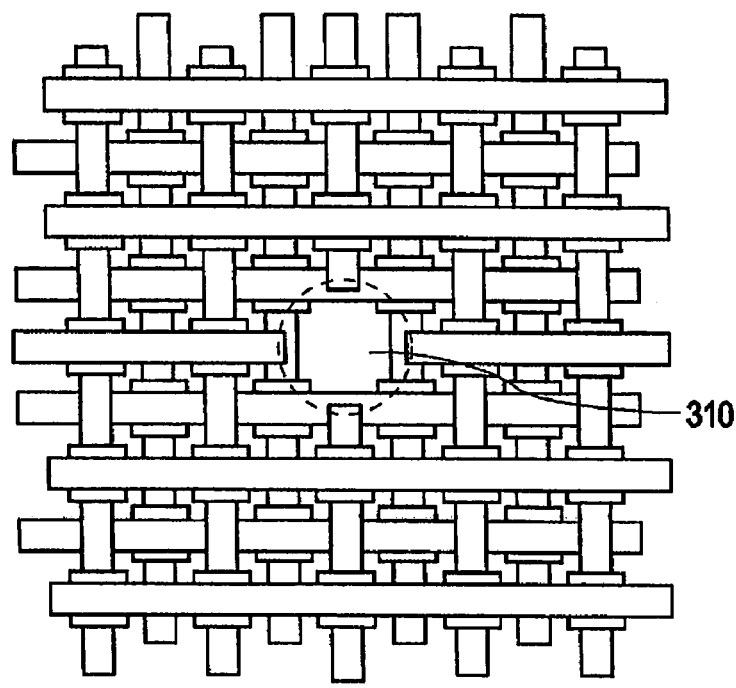
FIG. 8 is a sectional view of a functional device including a photonic crystal manufactured by a method according to at least one exemplary embodiment.

FIG. 8 is a sectional view of a resonator section 310 that is a point defect present in a photonic crystal manufactured by a method according to at least one exemplary embodiment. Electromagnetic waves with wavelengths corresponding to a photonic band gap of the photonic crystal can be localized in the resonator sections 310. That is, such electromagnetic waves can be confined in the resonator sections 310. Hence, a resonator including this photonic crystal has high confining ability. Electromagnetic waves with resonant wavelengths in a narrow range can be extracted from incident light using a wavelength selection filter including the resonator. The point defect is formed by removing a portion of this photonic crystal, displacing a portion thereof, or varying dimensions of a portion thereof such that selected electromagnetic waves have desired wavelengths. Resonators operating at desired wavelengths can be readily manufactured using photonic crystals manufactured by the method.

If a light-emitting device includes this photonic crystal and the resonator sections 310 are filled with an active medium, the light-emitting device can emit a laser beam with high efficiency when energy is applied to the light-emitting device using electromagnetic waves or a current. If the resonator sections 310 are useful in emitting light with a resonant wavelength of 800 to 1,800 nm that can be used for infrared communication, the light-emitting device can be used as a light source for optical communication. If the resonator sections 310 are useful in emitting a red, green, or blue light, the light-emitting device can be used for a light source for display units or a light source for optical pickups for CDs and DVDs. A high-performance integrated microcircuit can be obtained by combining various types of functional devices, such as resonators, light-emitting devices, and polarizers having dispersive properties within photonic band gaps, having at least one of the waveguide sections 300 and the resonator sections 310.

As described above, a photonic crystal can be manufactured so as to have optical properties close to target optical properties in such a manner that the thickness of layers included in the photonic crystal and the refractive index of periodic refractive index structures included therein are adjusted such that Equation 2 can be satisfied, even if the actual thickness of the layers deviates from the design thickness of the layers.

A functional device operating at desired wavelengths can be manufactured using a photonic crystal manufactured by a method according to at least one exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-136282 filed May 9, 2005, which is hereby incorporated by reference herein in its entirety.

What is claimed is:

1. A method for manufacturing a three-dimensional photonic crystal including a stacked plurality of layers, comprising:
   a step of controlling the thickness of the layers;
   a step of forming periodic refractive index structures in the layers; and
   in a case of an error in the thickness of each layer or dimensions of each periodic refractive index structure, a step of adjusting the thickness of each layer or dimensions of each periodic refractive index structure such that the layer satisfies the following equation:

$$(neff+\Delta neff) \times (H \times \Delta H) \times M = neff \times H$$

wherein H represents the design thickness of the layer, neff represents the design effective refractive index of the periodic refractive index structure, $\Delta$neff represents a deviation of the effective refractive index of the periodic refractive index structure from the design effective refractive index, ΔH represents a deviation of the thickness of the layer from the design thickness, and M represents a coefficient between 0.5 and 2.0.

2. The method according to claim 1, wherein the adjusting step includes the controlling step and the forming step in that order.

3. The method according to claim 1, wherein the adjusting step includes the forming step and the controlling step in that order.

4. The method according to claim 1,
wherein one of the plurality of layers is a first layer including a plurality of first rod-shaped structures arranged at a first predetermined pitch,
wherein another one of the plurality of layers is a second layer including a plurality of second rod-shaped structures, arranged at a second predetermined pitch, extending in the direction different from the direction in which the first rod-shaped structures extend,
wherein another one of the plurality of layers is a third layer including a plurality of third rod-shaped structures, arranged at a third predetermined pitch, extending in the same direction as the direction in which the first rod-shaped structures extend,
wherein another one of the plurality of layers is a fourth layer including a plurality of fourth rod-shaped structures, arranged at a fourth predetermined pitch, extending in the same direction as the direction in which the second rod-shaped structures extend,
wherein the first rod-shaped structures are displaced from the third rod-shaped structures by half of the pitch therebetween in the direction perpendicular to the direction in which the first and third rod-shaped structures extend,
wherein the second rod-shaped structures are displaced from the fourth rod-shaped structures by half of the pitch therebetween in the direction perpendicular to the direction in which the second and first rod-shaped structures extend, and
wherein the first to fourth layers are arranged in that order.

5. The method according to claim 4, wherein the adjusting step includes a sub-step of adjusting dimensions of the first to fourth rod-shaped structures.

6. The method according to claim 1,
wherein one of the plurality of layers is a first layer including a plurality of first rod-shaped structures arranged at a first predetermined pitch,
wherein another one of the plurality of layers is a second layer including a plurality of second rod-shaped structures, arranged at a second predetermined pitch, extending in the direction different from the direction in which the first rod-shaped structures extend,
wherein another one of the plurality of layers is a third layer including a plurality of third rod-shaped structures, arranged at a third predetermined pitch, extending in the same direction as the direction in which the first rod-shaped structures extend,
wherein another one of the plurality of layers is a fourth layer including a plurality of fourth rod-shaped structures, arranged at a fourth predetermined pitch, extending in the same direction as the direction in which the second rod-shaped structures extend,
wherein another one or more of the plurality of layers are additional layers which are parallel to the first to fourth layers and which include discrete structures spaced from each other,
wherein the first rod-shaped structures are displaced from the third rod-shaped structures by half of the pitch therebetween in the direction perpendicular to the direction in which the first and third rod-shaped structures extend,
wherein the second rod-shaped structures are displaced from the fourth rod-shaped structures by half of the pitch therebetween in the direction perpendicular to the direction in which the second and first rod-shaped structures extend, and
wherein the first to fourth layers are arranged in that order such that each additional layer is disposed between the first to fourth layers.

7. The method according to claim 6, wherein the adjusting step includes a sub-step of adjusting dimensions of the first to fourth rod-shaped structures and the discrete structures.

8. The method according to claim 6, wherein the adjusting step includes a sub-step of adjusting dimensions of the first to fourth rod-shaped structures or the discrete structures.

9. A functional device comprising a three-dimensional photonic crystal manufactured by the method according to claim 1, wherein the three-dimensional photonic crystal has a linear defect serving as a waveguide.

10. A functional device comprising a three-dimensional photonic crystal manufactured by the method according to claim 1, wherein the three-dimensional photonic crystal has a point defect serving as a resonator section.

11. A light-emitting device comprising the functional device according to claim 10 and an exciting unit, wherein the resonator section contains an active medium for emitting light and the exciting unit is configured to excite the active medium.

* * * * *